United States Patent [19]
Langen

[11] 4,029,824
[45] June 14, 1977

[54] METHOD OF AND APPARATUS FOR TREATING MEAT, MORE PARTICULARLY HAM MEAT

[75] Inventor: Christianus Petrus Langen, Cuyk, Netherlands

[73] Assignee: H. J. Langen & Sons Ltd., Rexdale, Canada

[22] Filed: Apr. 25, 1975

[21] Appl. No.: 571,592

[30] Foreign Application Priority Data
Apr. 26, 1974 Netherlands .................. 7405711

[52] U.S. Cl. ........................... 426/281; 426/641; 426/518; 426/519
[51] Int. Cl.² ........................................ A23B 4/02
[58] Field of Search ............ 426/58, 281, 332, 641, 426/642, 519, 518; 99/532-535

[56] References Cited
UNITED STATES PATENTS

| | | | |
|---|---|---|---|
| 2,629,311 | 2/1953 | Graves | 426/281 |
| 3,590,721 | 7/1971 | Hoffman | 426/281 |
| 3,775,134 | 11/1973 | Michels | 426/281 |
| 3,922,357 | 4/1973 | Townsend | 426/281 |
| 3,928,634 | 12/1975 | Gasbarro | 426/281 |
| 3,950,555 | 4/1976 | Stromberg | 426/281 |

FOREIGN PATENTS OR APPLICATIONS
7,008,821 12/1971 Netherlands ............... 426/281

Primary Examiner—Hiram H. Bernstein
Attorney, Agent, or Firm—Fetherstonhaugh & Co.

[57] ABSTRACT

A method and apparatus for treating meat. In the method, meat is tenderized, brought into contact with pickle or brine or the like, and massaged, characterized in that the meat is brought into a tumbling movement together with a pickle or brine bath, in such a manner that massaging forces are exerted on the meat by the action of gravity, while at the same time, also by the action of gravity on the meat, a number of nicking means guiding brine out of the bath is repeatedly introduced into the meat and removed therefrom. The apparatus comprises a tank having a support means adapted to move over a floor, an opening, a cover fitting over the opening and adapted to be coupled to the tank in sealing-tight relationship, and means for coupling the tank to a drive means for rotating the tank, characterized in that the tank is provided, at least at one wall part extending perpendicularly with respect to the plane of rotation of the tank, with a number of nicking means provided with longitudinal guides for the brine, said means projecting inwardly and at least substantially vertically with respect to said wall part.

2 Claims, 5 Drawing Figures

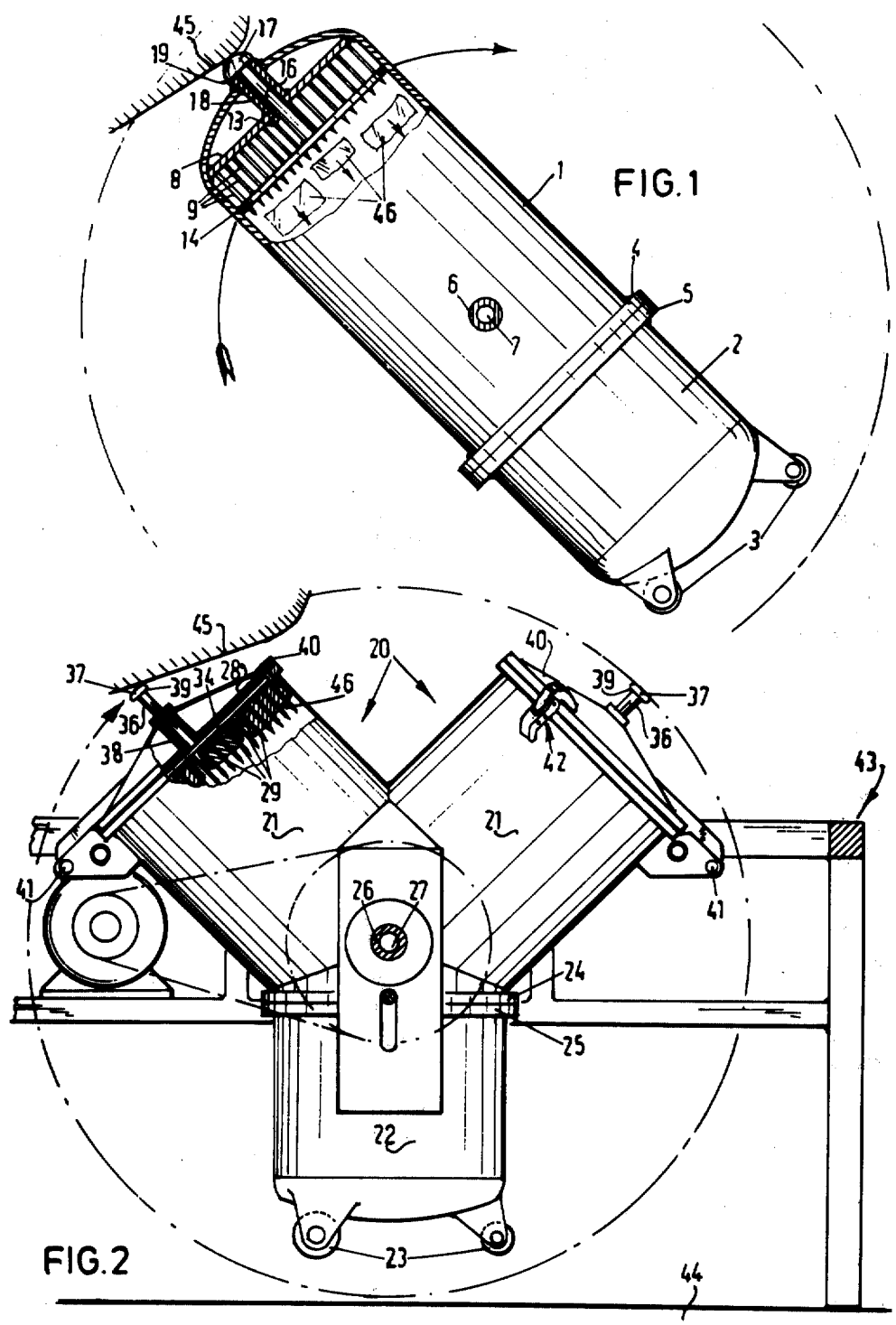

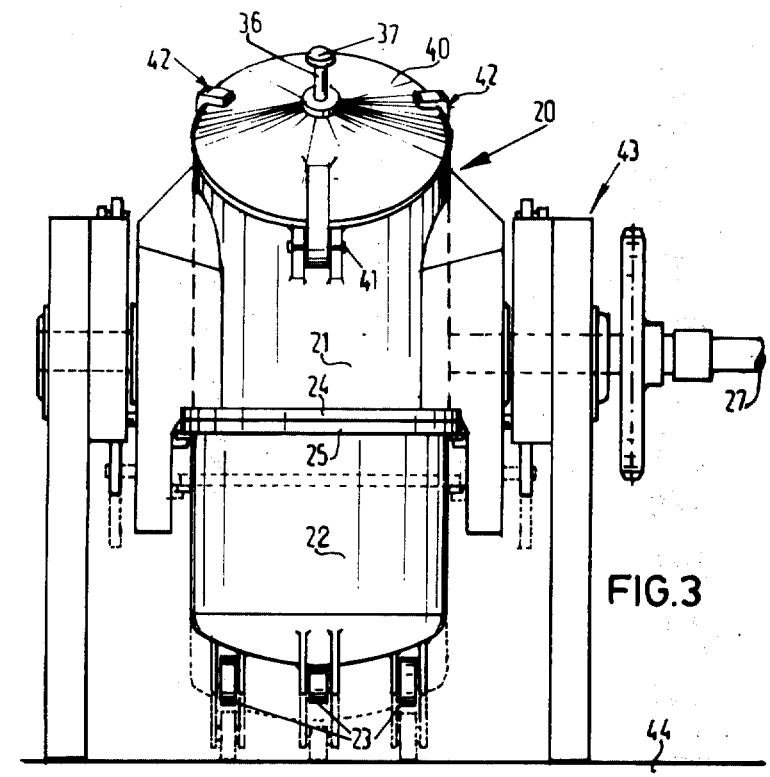
FIG.3
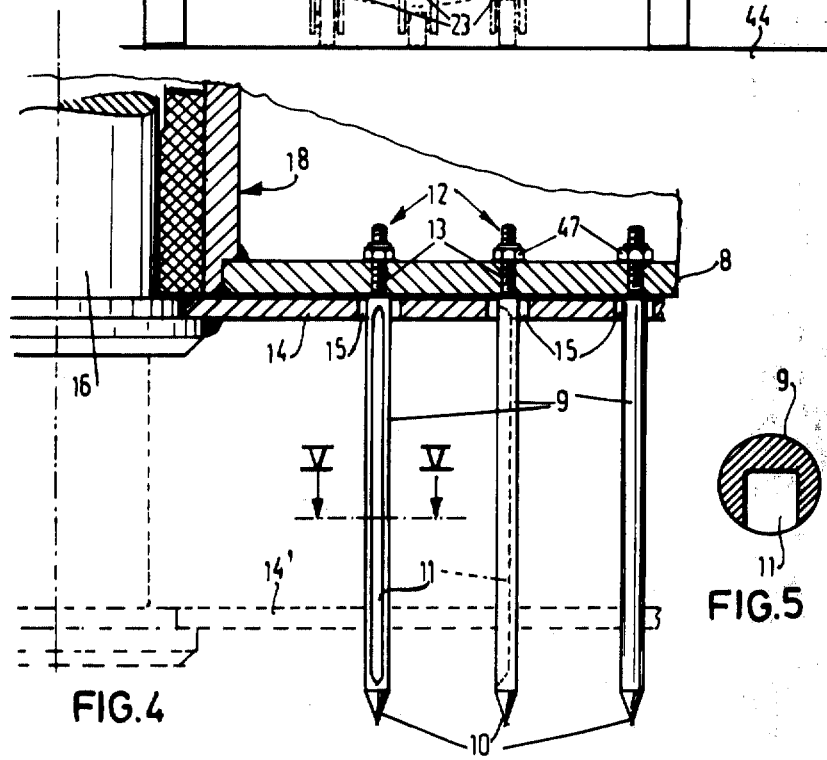
FIG.4
FIG.5

METHOD OF AND APPARATUS FOR TREATING MEAT, MORE PARTICULARLY HAM MEAT

This invention relates to a method of treating meat, more particularly ham meat, in which the meat is tenderized, brought into contact with brine or pickling agents, and massaged.

Treatment of this kind which was hitherto carried out in the form of a succession of a number of partial treatments, is intended to prepare the meat for pasteurization after it has been pressed into a mould determining the final shape of the end product, while retaining the maximum percentage and maximum uniformity of distribution of the juices in the meat.

Although the invention is aimed at bringing the meat into a state such that pasteurization can be carried out under optimum conditions with minimum juice losses, the method of treatment according to the invention does not include pressing in a mould and pasteurization of the meat, which operations can be carried out in any arbitrary suitable manner. The treatment according to the invention comprises solely the tenderizing, pickling and massaging of the meat.

Pickling of the meat is intended to improve its taste and keeping properties The massaging of the meat, which can be carried out after prior injection of pickle or brine or the like into the meat or in a pickling bath, is intended so to open the surface proteins of the meat that the pickle or brine or the like absorbed by the meat and other juices are more satisfactorily retained, so that the juice losses during the subsequent pasteurization treatment are kept at a minimum. Tenderizing of the meat, which was hitherto carried out as a first partial treatment, comprises nicking or opening the meat so that the surface via which the meat comes into contact with the brine or pickling bath, and the subsequent massage of the meat is operative, is made as large as possible.

Massaging of the meat is usually effected in a rotating tank in which the meat undergoes a massaging or kneading movement during rotation. Pickling of the meat can be carried out by prior injection with brine or pickling agents under pressure, i.e. as a separate partial treatment, which requires time and labour for carrying out the injection and for transporting the meat. Pickling may also take place during the massaging treatment; the above-mentioned rotating tank is then filled with a pickling bath in addition to the meat for treatment. In this latter case in particular, it is advisable to subject the meat to a tenderizing operation for which purpose the meat is taken through a device which nicks the meat at a number of points so that a larger operative meat surface is obtained for pickling and massage. This tenderizing operation also requires time and labour for its performance and for transportation of the meat.

SUMMARY

The object of the invention is to reduce the time and, more particularly, the labour required to carry out the above-described succession of partial treatments, i.e. tenderizing, pickling and massaging of the meat, and provide a combined method such that no time-consuming meat transport requiring to be carried out or controlled by separate labour is necessary between the successive partial treatments.

To this end, according to the invention, the meat is brought into movement together with a pickle or brine bath, in such a manner that massaging forces are exerted on the meat by the action of gravity, while at the same time, also by the action of gravity on the meat, a number of nicking means guiding brine out of the bath is repeatedly introduced into the meat and removed therefrom.

A first advantage of this step is that both the purchase and use of a separate tenderizing or pickle or brine injection device can be avoided. Separate labour, i.e. physical exertion and/or supervision by an operative to operate such a device and for transporting the meat from such a device to the massaging tank, is unnecessary. A second advantage is that a much longer-lasting and more intensive penetration of the brine or the like in the meat and hence a greater effect of the massaging treatment are obtained, and this reduces the juice losses occurring on subsequent pasteurization. Apart from a saving in transportation time, this improved quality is also accompanied by a reduction of the treatment time.

Although it is possible, according to the invention, to drive the nicking means into the meat which is pressed by gravity against a wall part of the tank, it is preferable for the meat first to drop on to the nicking means and then drop and/or be pushed off the same.

The invention also provides a special apparatus for the new method. This apparatus is derived from a standard apparatus for massaging meat, consisting of a tank having a support means movable over a floor, an opening, a cover fitting over the opening and adapted to be coupled in sealing-tight relationship to the tank, and with means for coupling the tank to the drive means for rotating the tank. The said drive means may, for example, be of the type described in Applicant's U.S. Pat. Spec. No. 3,746,316. According to the invention, a tank of this kind should be so constructed that the tank is provided, at least at one wall part extending perpendicularly with respect to the plane of rotation of the tank, with a number of nicking means provided with longitudinal guides for the brine, said means projecting inwardly and at least substantially vertically with respect to said wall part. In such an apparatus, during the rotary movement of the tank the meat drops regularly on to the nicking means which, as a result of the weight of the meat, penetrate the same to the required depth and feed the brine or the like into the nicks via the longitudinal guides or slots, before the meat drops off the nicking means.

To ensure that the meat drops on to said means in the correct direction as far as possible, i.e. the longitudinal direction of the nicking means, according to the invention, conveniently, the tank comprises a number of wall parts which extend over some distance at least substantially vertically with respect to the wall part provided with the nicking means. This avoids any loading in the transverse direction of the nicking means by the meat as far as possible. This effect is readily achieved according to the invention if the tank has a cylindrical body, one end wall part of which acts as bearer element for the nicking means or is coupled thereto. In a preferred embodiment of the tank, the tank comprises a set of two cylindrical bodies, the cylinder axes of which extend at least substantially vertically with respect to one another. The dropping of the meat, i.e. the falling of the meat from the nicking means, can be improved according to the invention by the use of a perforated sliding plate, the perforations of which enclose the nicking means and whose side adjacent the said wall part is coupled to a drive rod which extends through said wall part and which, during the rotary movement of the tank, moves inwardly of the tank by means of a stop situated outside the tank. In that case, the meat does not simply drop from the nicking means but is also pushed off the same.

The nicking means may be made from strips of sheet metal which are stiffened against buckling loads and which are provided with a longitudinal guide for the brine or the like. According to the invention, however, it is preferable if the nicking means are formed by a set of pointed pins which, over at least a part of their length, have a slot for guiding brine at their periphery. In order to ensure that the pin longitudinal brine guide is not completely filled by the surrounding meat, which would reduce the introduction of brine into the meat, the invention also proposes that the slot extends from a fixing end intended for fixing to a wall part or a bearer element coupled thereto to some distance from the pointed free end of a pin. The opening formed by such a pin in meat then has a cross-section such that the slot in the pin is not completely filled by meat and can guide the brine or the like.

Although the pins can be secured to the associated wall part of the tank or to a bearer element coupled to the wall part, in any arbitrary way, for example by welding, interchangeability of the pins according to the invention is promoted if the fixing end of a pin is provided with external screwthreading by means of which the pin can be screwed in bores in the associated wall part or the bearer element coupled thereto.

PREFERRED EMBODIMENT

The invention will be explained in the following description with reference to the accompanying drawing, which shows a number of embodiments, to which the invention is not limited however. In the drawing:

FIG. 1 is an axial section through a first embodiment of a treatment tank according to the invention.

FIG. 2 is a side elevation in partial section, showing a second embodiment of a treatment tank according to the invention coupled to a drive means, which is shown only diagrammatically, to rotate the treatment tank.

FIG. 3 is also a diagrammatic view of the drive means and the tank according to FIG. 2.

FIG. 4 is a detail to an enlarged scale on the arrow IV in FIG. 2 and

FIG. 5 is a cross-section through a pin on the line V—V in FIG. 4.

The embodiment of the invention illustrated in FIG. 1 comprises a treatment tank 1 with a cover 2 which, in the present embodiment, itself has a considerable capacity and is provided with a support in the form of a set of three rollers 3 by means of which the cover can be moved over a floor (not shown in FIG. 1). The tank 1 is coupled to the cover 2 by means of coupling means (not shown) along the flanges 4 and 5 of the tank 1 and the cover 2 respectively Since the main feature of the invention resides in the integar 1 and not in the integer 2, these integers are referred to respectively as "tank"- 'and "cover"within the present invention, but it is clear that this designation is relatively arbitrary.

A shaft 6 is secured to the tank 1 for coupling to a drive means (not shown in FIG. 1). The shaft 6 is formed with a bore 7 which connects the interior of the tank 1 to a vacuum pump (not shown).

According to the invention, the right-hand side of the tank in FIG. 1 is provided with a bearer element 8 which in practice operates as the innermost wall part of the tank at that point and which is secured to the tank inner wall, a number of pins 9 which extend in parallel and along the tank axis projecting from the said bearer element 8 and acting as nicking means. As will be apparent in greater detail from FIG. 4, the free end of the pins is formed with a point 10 and they are formed with a slot 11 over a considerable part of their length, the function of said slot being described hereinafter, and the pins having a fixing end 12 provided with external screwthreading by means of which they are screwed in a matching internally screwthreaded bore 13 in the bearer element 8. The pins may be secured to the bearer element 8 in any other suitable manner, for example by welding. In principle it is possible to dispense with a separate bearer element 8, in which case the pins 9 are secured directly to the right-hand wall end part of the tank 1.

The tank 1 also comprises a perforate sliding plate 14, whose perforations 15 enclose the pins 9 and whose side facing the bearer element 8 or the right-hand end wall part of the tank 1 is coupled to a drive rod 16 which extends through said wall part and which has a thickened head 17 at its free end. The drive rod 16 passes in sealing-tight relationship through a sleeve 18 which is provided at the said right-hand end wall part and the details of which will not be described more fully here. As will be apparent from FIG. 2, the drive rod 16 is moved uniformly towards the interior of the tank during the rotation thereof, said movement being limited by a stop 19 which is disposed on the drive rod 16 and which cannot pass the sleeve 18.

In the position shown in FIG. 1, the sliding plate 14 is situated near the points 10 of the pins 9, i.e. near the bearer element. On the said inward movement of the drive rod 16, the sliding plate 14 coupled thereto is also moved towards the interior of the tank 1, and any meat stuck on the pins 9 is pushed off the pins by the sliding plate 14, the performations 15 of which surround the pins 9.

Before the operation of the embodiment of the invention shown in FIG. 1 is explained, the embodiment shown in FIGS. 2 and 3 will first be described, the operation of this embodiment corresponding in principle to the embodiment already described hereinbefore.

The tank 20 shown in FIGS. 2 and 3 comprises two cylindrical hollow bodies 21 each of which may be compared to the tank 1 according to FIG. 1, but which extend with their centre-lines at an angle of at least approximately 90° to one another and which are combined to form one tank 20 by welding. The tank 20 comprises a cover 22 with rollers 23, all of which are in conformity with cover 2 and the rollers 3 according to FIG. 1, and the same applies to the flange 24 which can be coupled in sealing-tight relationship to the flange 25 of the tank 20, although the way in which this is done not shown in the drawings. The member 20 comprises a shaft 26 for coupling to the drive means 43 shown diagrammatically, while the shaft 26 is formed with an axial bore 27 for connecting the interior of the tank 20 to a vacuum pump (not shown).

Each of the cylindrical members 21 is provided with a bearer element 28 having a number of pins 29 extending in parallel relationship to one another and along the axis of the associated member 21, each such pin having a point 30, slot 31 and fixing end 32 by means of which they are screwed into bores 33 in the bearer element 28. Each of the cylindrical members 21 also has a sliding plate 34 at its outer end, with perforations 35 which surround the pins 29, while the other end has a drive rod 36 with a head 37 at its free end and extending through the wall end part through a guide sleeve 38. A stop on the drive rod 36 limited the movement thereof.

Both the constructional and operational details of the above-described components or members 21 —39 are identical to those of the components or elements 1 —19 in FIG. 1 and are therefore not described in any greater detail.

In the embodiment shown in FIGS. 2 and 3, the end wall parts of the cylindrical members 21 are constructed as separate covers 40 which can pivot with respect to their associated member 21 by means of a hinge construction 41 (see FIG. 2) and which can be coupled to the member 21 in sealing-tight relationship through the agency of coupling means 42 of conventional type. This step, which is not shown in, but which can be applied to, the embodiment shown in FIG. 1 has the advantage that the bearer element 28 (8) and the sliding plate 34 (14) are more readily accessible for cleaning and maintenance.

The embodiment shown in FIGS. 2 and 3 is illustrated in the position in which the tank 20 is coupled to a drive means 43 which can lift a tank 20 bearing by rollers 23 of cover 22 on the floor 44 (or, referring to FIG. 1, a tank 1 resting on floor 44 via the rollers 3 of cover 2), can effect coupling to shaft 26 or 6, and then drive the tank with a rotary movement according to the broken-line arrow in FIG. 2. The drive means 43 does not itself form part of the invention and may be of any suitable type, for example the type described in Applicants' laid-open Dutch Patent Application No. 70.08822, or the substantially corresponding U.S. Pat. Spec. NO. 3,734,316 of 17th July 1973, the rights in which also accrue to Applicants. We shall not describe the construction and operation of the drive means 43 here but would refer to the above-mentioned publications. The drive means 43 which is used in this invention and which rests on the floor 44 should comprise a fixed and possibly adjustable cam ridge 45. During the rotary movement of the container according to the arrow shown in FIG. 2, the head 37 or 17 of the drive rod 36 or 16 meets this cam ridge so that the drive rod is moved inwardly of the tank so that the sliding plate 34 or 14 is also moved inwardly of the tank so that any meat 46 stuck on the pins 29 or 9 (see FIGS. 2 and 4) is pushed off the same.

FIG. 4 is a detail on the line IV in FIG. 2.

The pins 29 (9) are screwed on the bearer element 28 (8) at their fixing ends 32 (12) by means of nuts 47, and they extend through bores 33 (13) in the bearer element. The sliding plate 34 (14), the perforations 35 (15) of which surround the pins 29 (9) with some clearance, bears against the element 28 (8). At its side remote from the points 30 (10) of the pins, the sliding plate 34 (14) is welded to a drive rod 36 (16) for axial displacement of the sliding plate along the pins. When the drive rod head 37 (17) comes into contact with the said cam ridge 45 of the drive means 43 during rotary movement of the tank, the drive rod together with the sliding plate is moved inwardly, and any meat 46 left on the pins 29 (9) is pushed off the same.

As will be apparent from FIGS. 4 and 5, the pins 29 (9) are formed with a slot (31) (11) over a considerable part of their length, said slots extending from near the fixing end 32 (12) of a pin to some distance from its point 30 (10). The latter makes in the meat 46 an opening which is of substantially circular cross-section so that the slot 31 (11) is not completely filled by penetrating meat and can ensure that brine is introduced into the meat.

Following the above description of the construction of the tank according to the invention, the practical operation of the invention will now be explained.

It will be assumed that a reservoir filled with a quantity of meat 46 for treatment, for example ham meat, in the form of a cover 2 (22) bearing by its rollers 3 (23) on the floor 44 is driven to a position beneath the tank 1 (20), which is already coupled to the drive means 43. The tank 1 (20) is then coupled by the drive means 43 to the tank 2 (22) in manner not described in detail, whereupon the complete system is raised into its operating position shown in FIG. 2 and rotated. The reservoir 2 (22) is also filled with a brine or pickling bath (not shown in the drawing) in addition to the meat 46 for treatment. During the rotation of the unit comprising a reservoir 2 (22) and a tank 1 (20) by means of the drive system 43, the meat 46 and the brine are moved by gravity alternately from the reservoir 2 (22) into the container 1, i.e. first one and then the other cylindrical member 21, and during this process the meat drops practically vertically on to the bearer element 8 (28) provided with the pins 9 (29) as a result of the cylindrical shape of the container 1, so that the pins penetrate the meat 46. The liquid brine is fed via the slots 11 (31) into the openings formed in the meat. As the rotary movement continues, the meat 46 starts to slide off the pins 9 (29) while the sliding plate 14 (34), which is driven as described by the drive rod 16 (36), assists this movement and pushes the meat off the pins. As soon as the meat 46 has been released from the pins, it undergoes a kneading and massaging treatment from the wall parts of the tank and reservoir and also under the influence of its own weight, so that the surface proteins of the meat are opened. As a result of the invention this effect takes place not just at the outer surface of the meat but also along the walls of the openings formed by the pins penetrating the meat. The pins 9(29) therefore always exert a tenderizing effect on the meat 46 and this is continued during the entire treatment in the tank 1 (20). The effect of this combination of tenderizing, pickling and massaging as provided by the invention is that there is a continuous succession of the said partial treatments without any separate time or labour being required for transporting the meat between the various partial treatments.

As will be apparent from the foregoing, during the treatment according to the invention the meat is subjected to a continuous succession of tenderizing, brine introduction and massage, so that the surface proteins of the meat are opened over a very large effective surface. As already stated, this is very important for subsequent pasteurization to which the meat should be subjected. It is well known that when the surface proteins of the meat are opened a sealing film forms at the said surface and prevents any appreciable loss of juice during the pasteurization treatment. It will be apparent that when the invention is applied, with the meat being subjected to a continuous session of tenderizing (by pins 9, 29), brine introduction (at the outer surface of the meat and via the slots (11, 31 in the pins) and massage (by the inner wall parts of the tank 1 (20), and the reservoir 2, (22), there is a very effective contribution towards opening the meat surface proteins without any separate tenderizing, brine injection and massage being necessary for the meat. This means a saving in investments costs, since no separate tenderizer and/or brine injector need be used, while in addition there is a saving of treatment time and transport of meat between successive partial treatments. The use of gravity for tenderizing can also be regarded as an extra energy economy; of course it is also possible touse moving pins 9, 29. Finally, the nicking means need not be constructed in the form of pins, and other nicking means suitably shaped and provided with a guide for the brine may be used.

What I claim is:

1. In a process of curing meat in a rotary tumbling device having a closed tumbling chamber partly filled with a bath of curing fluid comprising pickling fluid, the steps of repeatedly:
   a. massaging the meat by tumbling the meat in and out of said bath within said chamber in response to rotation of said chamber, and thereafter;
   b. simultaneously tenderizing and curing the meat by rotating the tumbling device to cause the meat to fall downwardly under the influence of gravity randomly oriented into the bath and onto a plurality of penetrating means located within said chamber and extending upwardly to be penetrated by the said means and thus tenderized, the meat absorbing the curing fluid from the bath and being thus cured, and thereafter;
   c. removing said meat from said penetrating means as said tumbling device is rotated, and alternately repeating the cycle of massaging and simultaneous tenderizing and curing while catching and mixing the juices escaping from the meat with said bath.

2. A process as claimed in claim 1 wherein curing fluid is admitted to the penetrating means from said bath of curing fluid during the rotation of the portion of the tumbling chamber in which the penetrating means is located through the lower segment of its arc of rotation, before the meat falls onto the penetrating means to be penetrated thereby.

* * * * *